US008179799B2

(12) United States Patent  (10) Patent No.: US 8,179,799 B2
Dolisy  (45) Date of Patent: May 15, 2012

(54) METHOD FOR PARTITIONING NETWORK FLOWS BASED ON THEIR TIME INFORMATION

(75) Inventor: Joel Dolisy, Austin, TX (US)

(73) Assignee: Solarwinds Worldwide, LLC, Austin, TX (US)

( * ) Notice: Subject to any disclaimer, the term of this patent is extended or adjusted under 35 U.S.C. 154(b) by 1000 days.

(21) Appl. No.: 11/987,560

(22) Filed: Nov. 30, 2007

(65) Prior Publication Data

US 2009/0141638 A1    Jun. 4, 2009

(51) Int. Cl.
*G06F 11/00* (2006.01)
*H04L 1/00* (2006.01)
*H04L 12/26* (2006.01)

(52) U.S. Cl. ..................... 370/235; 370/235.1
(58) Field of Classification Search ........... 370/241, 370/359, 381, 389, 392, 252–255, 395.34, 370/395.52, 235, 235.1, 241.1, 229–234, 370/230.1, 236, 236.1, 236.2, 395.3, 395, 370/31, 395.5, 428, 429, 419; 709/224, 223; 726/12–13; 713/152
See application file for complete search history.

(56) References Cited

U.S. PATENT DOCUMENTS

| | | | |
|---|---|---|---|
| 6,405,251 B1 * | 6/2002 | Bullard et al. ............... | 709/224 |
| 6,625,657 B1 | 9/2003 | Bullard | |
| 6,751,663 B1 | 6/2004 | Farrell et al. | |
| 7,167,860 B1 | 1/2007 | Black et al. | |
| 7,243,143 B1 | 7/2007 | Bullard | |
| 7,385,924 B1 * | 6/2008 | Riddle ........................ | 370/235 |
| 7,508,764 B2 * | 3/2009 | Back et al. ................... | 370/235 |
| 7,587,513 B1 * | 9/2009 | Maturi et al. ................ | 709/234 |
| 7,660,892 B2 * | 2/2010 | Choong et al. .............. | 709/224 |
| 2001/0021176 A1 * | 9/2001 | Mimura et al. ............. | 370/235 |
| 2002/0019875 A1 * | 2/2002 | Garrett et al. .............. | 709/230 |
| 2004/0030927 A1 * | 2/2004 | Zuk .............................. | 713/201 |
| 2004/0267945 A1 * | 12/2004 | Reiss .......................... | 709/229 |
| 2005/0039104 A1 * | 2/2005 | Shah et al. ................... | 714/776 |
| 2005/0286423 A1 * | 12/2005 | Poletto et al. ............... | 370/235 |
| 2006/0089985 A1 * | 4/2006 | Poletto ........................ | 709/224 |
| 2006/0168168 A1 | 7/2006 | Xia et al. | |
| 2007/0150497 A1 * | 6/2007 | De La Cruz et al. ......... | 707/101 |
| 2007/0201359 A1 | 8/2007 | Matsubara et al. | |
| 2008/0291915 A1 * | 11/2008 | Foschiano .................... | 370/392 |

OTHER PUBLICATIONS

Non-Final Office Action, dated Feb. 5, 2010, in U.S. Appl. No. 11/987,562.
Non-Final Office Action, dated Jun. 11, 2010, in U.S. Appl. No. 11/987,561.
Non-Final Office Action, dated Nov. 1, 2010, in U.S. Appl. No. 11/987,561.
Non-Final Office Action, dated Nov. 15, 2010, in U.S. Appl. No. 11/987,562.

* cited by examiner

*Primary Examiner* — Chuong T Ho
(74) *Attorney, Agent, or Firm* — Squire Sanders (US) LLP

(57) ABSTRACT

To organize flows records into buckets and optimize their indexed access to/from storage medium, a bucket identifier is associated with each flow record. The bucket identifier is derived from some other characteristic of the network flow, such as a timestamp or source identification associated with the network flow. In this way, contention is decreased as analysis can occur on the aggregated flow records, while new flow records are stored.

18 Claims, 7 Drawing Sheets

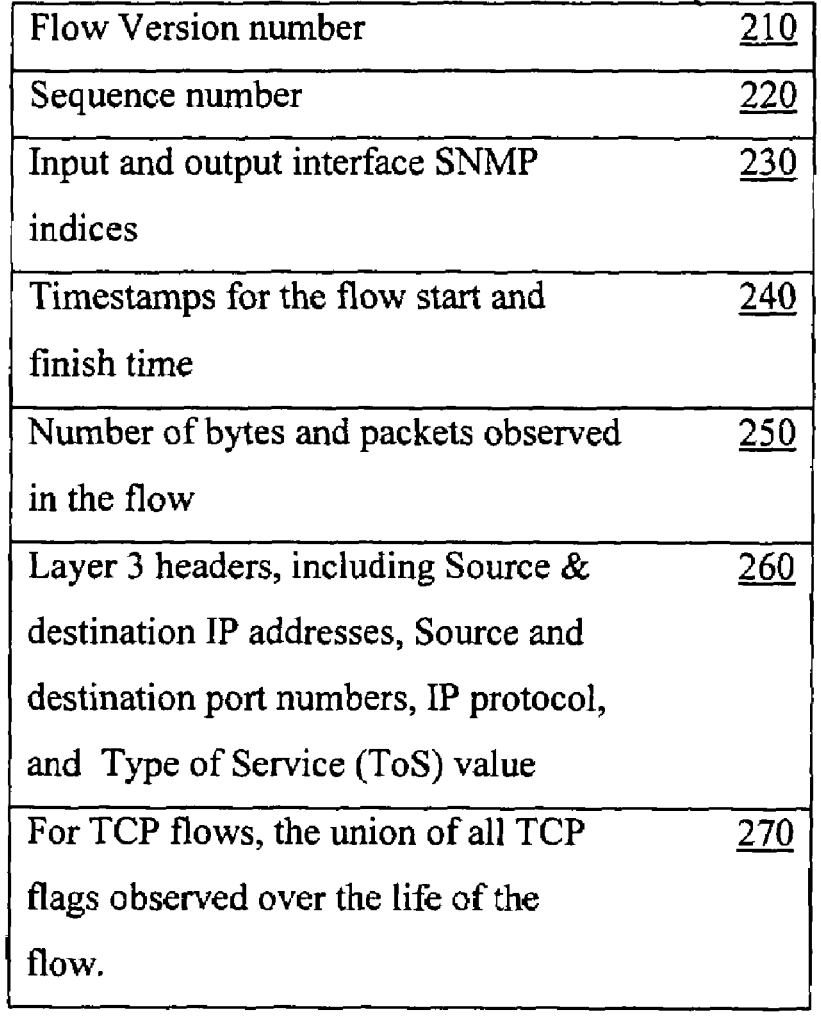

Exemplary Flow Record 200

| | |
|---|---|
| Flow Version number | 210 |
| Sequence number | 220 |
| Input and output interface SNMP indices | 230 |
| Timestamps for the flow start and finish time | 240 |
| Number of bytes and packets observed in the flow | 250 |
| Layer 3 headers, including Source & destination IP addresses, Source and destination port numbers, IP protocol, and Type of Service (ToS) value | 260 |
| For TCP flows, the union of all TCP flags observed over the life of the flow. | 270 |

Figure 2

(PRIOR ART)

| Flow Record Number 310 | Source IP Address 320 | Time Stamp 330 | Byte Size 340 |
|---|---|---|---|
| 1 | xxx.xxx.x.1 | $t_1$ | 10 |
| 2 | xxx.xxx.x.1 | $t_2$ | 50 |
| 3 | xxx.xxx.x.2 | $t_3$ | 20 |
| ⋮ | ⋮ | ⋮ | ⋮ |
| n | xxx.xxx.x.k | $t_n$ | $b_n$ |

Flow Table 300

Figure 3

(PRIOR ART)

| Flow Record Number 410 | Source IP Address 420 | Time Stamp 430 | Byte Size 440 | Cluster No. 450 |
|---|---|---|---|---|
| 1 | xxx.xxx.x.1 | $0<t_1<T_1$ | 10 | 1 |
| 2 | xxx.xxx.x.2 | $0<t_2<T_1$ | 50 | 1 |
| 3 | xxx.xxx.x.1 | $T_1<t_3<T_2$ | 20 | 2 |
| ⋮ | ⋮ | ⋮ | ⋮ | ⋮ |
| n | xxx.xxx.x.k | $T_{x-1}<t_n<T_x$ | $b_n$ | x |

Modified Flow Table 400

Figure 4

| Flow Record Number 610 | Source IP Address 620 | Time Stamp 630 | Byte Size 640 | Cluster No. 650 |
|---|---|---|---|---|
| 1 | xxx.xxx.x.1 | $0<t_1<T_1$ | 10 | 1 |
| 2 | xxx.xxx.x.2 | $0<t_2<T_1$ | 50 | 2 |
| 3 | xxx.xxx.x.1 | $T_1<t_3<T_2$ | 20 | 1 |
| ⋮ | ⋮ | ⋮ | ⋮ | ⋮ |
| n | xxx.xxx.x.k | $T_{x-1}<t_n<T_x$ | $b_n$ | k |

Modified Flow Table 600

| Flow Record Number 810 | Source IP Address 820 | Time Stamp 830 | Byte Size 840 | Cluster No. 850 |
|---|---|---|---|---|
| 1 | xxx.xxx.x.1 | $0<t_1<T_1$ | 10 | 1-1 |
| 2 | xxx.xxx.x.2 | $0<t_2<T_1$ | 50 | 2-1 |
| 3 | xxx.xxx.x.1 | $T_1<t_3<T_2$ | 20 | 1-2 |
| ⋮ | ⋮ | ⋮ | ⋮ | ⋮ |
| n | xxx.xxx.x.k | $T_{x-1}<t_n<T_x$ | $b_n$ | k-x |

Modified Flow Table 800

Figure 8

Page 7 of 7

METHOD FOR PARTITIONING NETWORK FLOWS BASED ON THEIR TIME INFORMATION

FIELD OF THE INVENTION

The present invention relates to organizing of network flow information created during network monitoring within a relational data store to minimize the latency of insert and query operation for large sets of data by organizing the flows using a bucket identifier is associated with each flow.

BACKGROUND OF THE INVENTION

Network usage data is useful for many important business functions, such as subscriber billing, marketing & customer care, product development, network operations management, network and systems capacity planning, and security. Network usage data does not include the actual information exchanged in a communications session between parties, but rather includes numerous usage detail records, known as "flow records" containing one or more types of metadata (i.e., "data about data"). Known network flow records protocols include Netflow®, sFlow®, jFlow®, cFlow® and Netstream®. As used herein, a flow record is defined as a small unit of measure of unidirectional network usage by a stream of IP packets that share common source and destination parameters during a time interval.

The types of metadata included within each flow record vary based on the type of service and network involved and, in some cases, based on the particular network device providing the flow records. In general, a flow record provides detailed usage information about a particular event or communications connection between parties, such as the connection start time and stop time, source (or originator) of the data being transported, the destination or receiver of the data, and the amount of data transferred. A flow record summarizes usage information for very short periods of time (from milliseconds to seconds, occasionally minutes). Depending on the type of service and network involved, a flow record may also include information about the transfer protocol, the type of data transferred, the type of service (ToS) provided, etc. In telephony networks, the flow records that make up the usage information are referred to as call detail records (CDRs).

In network monitoring, the network flow records are collected, stored and analyzed to produce meaningful result. Network usage analysis systems process these flow records and generate reports or summarized data files that support various business functions. Network usage analysis systems provide information about how a network services are being used and by whom. Network usage analysis systems can also be used to identify (or predict) customer satisfaction-related issues, such as those caused by network congestion and network security abuse. In one example, network utilization and performance, as a function of subscriber usage behaviour, may be monitored to track a user's experience, to forecast future network capacity, or to identify usage behavior indicative of network abuse, fraud and theft.

As networks become larger and as more tasks are performed within the networks, such as transferring conventional telephone communications to Voice over IP (VOIP), the network flow on the data transactions can be voluminous and will quickly exceed storage and processing capacities.

In response to this problem of the large volume of the collected network flow information, one known solution uses sampling techniques to decrease data flow volume. Different sampling methods can be used by the network device to collect the information. Sampling can be done at the packet level or the flow level, and can be random or deterministic. Depending on which type of sampling method used, the effect will apply to CPU/memory utilization on the network device and/or bandwidth usage to export flow information to the collector. While the sampling may reduce the overall volume of collected network flow information, the total amount of data is often still voluminous. Furthermore, sampling does not address other problems within current network monitoring methodologies. For example, sampling techniques may not provide a proper picture of the network traffic because some data is being ignored in the process.

For example, another problem with current network monitoring methodologies is a contention in storage resources when trying to access the stored network flow information as additional network flow information is regularly being added. Typically, as network flow data is being accessed for analysis, new network flow information cannot be stored. Likewise, as new network flow information is in the process of being stored, the existing network flow data typically cannot be accessed.

SUMMARY OF THE INVENTION

In order to organize flows in time buckets and optimize their indexed access to/from storage medium, a bucket identifier is associated with each flow. The bucket identifier is derived from some other characteristic of the network flow, such as a timestamp associated with the network flow. In this way, contention is decreased as analysis can occur on the aggregated flow records, while new flow records are stored.

In one embodiment, a system organizes network flow information, the system including a storage system. The storage system includes a raw data table including flow records including data categories and a plurality of cluster identifiers, wherein one of the cluster identifiers is appended to each of the flow records and wherein the cluster identifiers are produced using at least one of the data categories. The system also optionally includes sub-tables configured to receive data from the raw data table, where each of the sub-tables is uniquely associated with one of the cluster identifiers. The raw data table may also be configured to be partitioned by moving each of the flow records into one the sub-tables associated with the cluster identifier appended to that flow record.

Optionally, the storage system further includes aggregated data tables, that are each associated with one of the sub-tables and wherein each of the aggregated data tables is configured to receive and aggregate flow record data contained in the associated sub-table. Optionally, each of the flow records includes a time stamp and the cluster identifiers are produced according to the timestamps. In particular, the flow records are grouped by according to predefined time periods with each of the cluster identifiers identifying a different time period. The time period may overlap, be of equal duration or have a relatively greater duration than others of the time periods.

Optionally, each of the flow records includes a network device identifier and where the cluster identifiers are produced according to the network device identifiers. In addition, the system may include a first aggregated data table containing first aggregated flow records for a first network device in a first prior time period, and a second aggregated data table to aggregated flow records for a second network device in the first prior time period. Optionally, the storage system further includes a first aggregated data table containing first aggregated flow records for a first network device in a first time period, and a second aggregated data table containing second aggregated flow records for the first network device in a second time period.

Optionally, the system further includes: a flow generating device configured to provide new flow records to the raw data table; and a data analysis device configured to analyze the aggregated data tables, whereby the system is configured such that the flow generating device and the data analysis device operate concurrently. Also, the system may further include an archival storage system that is configured to store the raw flow record data for the first network device.

In another embodiment, a method for organizing network data flows includes, during a first period of time, storing first flow records in a first table, the first flow records including data categories. The method includes appending a cluster identifier to each of the first flow records, wherein the cluster identifiers are produced using at least one of the data categories. The method also optionally includes the steps of, after the first period of time and during a second period of time, creating a second table, storing second flow records in the second table, and moving each of the second flow records to sub-tables configured to receive data from the raw data table according to the cluster identifiers, wherein each of the sub-tables is uniquely associated with one of the cluster identifiers.

Optionally, the method includes the steps of aggregating the moved second flow records in each of the sub-tables. Optionally, in the method includes archiving the first flow records and the second flow records; and compressing the archived first and second flow records.

A system for organizing network flow information, the system includes: a flow generating device configured access a storage system to provide flow records; a storage system configured to receive and store flow records and to append a cluster identifier to each of the first flow records, and a data analysis device configured to access the storage system, where the flow generating device and the data analysis device are configured to access the storage system concurrently. Optionally, the storage system includes sub-tables, and each of the sub-tables is uniquely associated with one of the cluster identifiers.

The storage system further includes aggregated data tables, wherein each of the aggregated data tables is associated with one of the sub-tables and wherein each of the aggregated data tables is configured to receive and aggregate flow record data contained in the associated sub-table. Optionally, each of the flow records includes a time stamp and where the cluster identifiers are produced according to the timestamps. Optionally, each of the flow records includes a network device identifier and where the cluster identifiers are produced according to the network device identifiers. The system further includes an archival storage that is configured to store the raw flow record data.

BRIEF DESCRIPTION OF THE DRAWINGS

The above and other objects, features and advantages of certain exemplary embodiments of the present invention will be more apparent from the following detailed description taken in conjunction with the accompanying drawings in which:

FIG. 2 (prior art) depicts a known exemplary flow record;

FIG. 3 (prior art) depicts a known exemplary table for storing the flow records;

FIGS. 4, 6 and 8 depict exemplary tables for storing the flow records in accordance with embodiments of the present invention; and FIGS. 5, 7, and 9 depict databases for aggregating the flow records in the flow records analysis system of FIG. 1 in accordance with embodiments of the present invention.

DETAILED DESCRIPTION OF THE PREFERRED EMBODIMENTS

Figure 1:
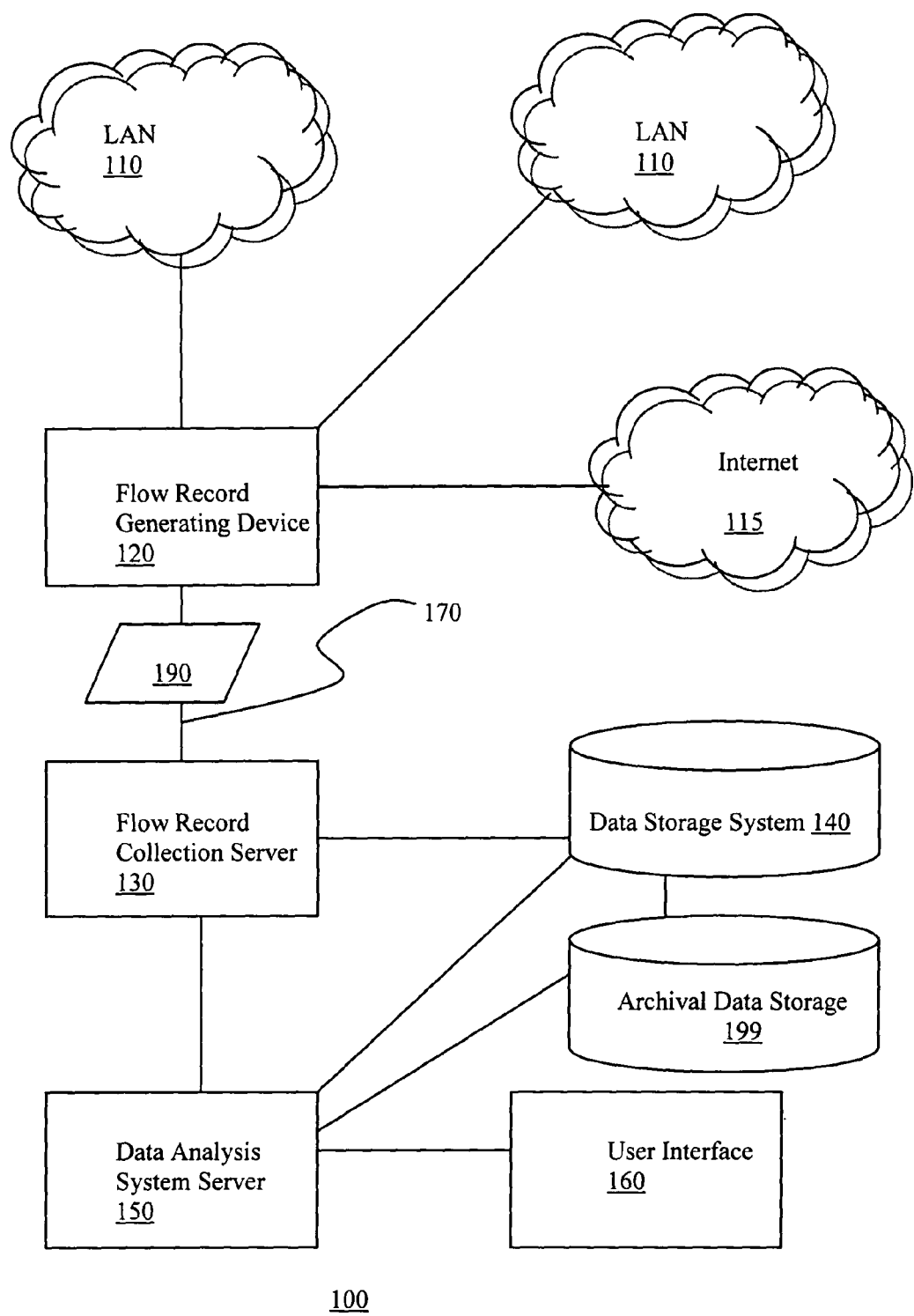
FIG. 1 depicts a flow records analysis system in accordance with embodiments of the present invention.

As shown in FIG. 1, a network usage analysis system 100 includes a data collection system server 130 and a data storage system 140, in one embodiment. The data collection system server 130, also called a listener, is a central server that collects the flow data 190 from all various network agents 120 to storage and analysis. The data collection system server 130 receives flow records 190 from the flow record generating device 120, which is a network device that is part of an IP network 110. In one embodiment, network 110 includes the Internet 115.

In general, flow record generating devices 120 may include substantially any network device capable of handling raw network traffic at "line speeds" and generating flow records from that traffic. Exemplary flow record generating devices 120 include routers, switches and gateways, and in some cases, may include application servers, systems, and network probes. In most cases, the small flow record records generated by flow record generating devices 120 are exported as a stream of flow records 190 to the data collection system server 130.

Various network protocol run on network equipment for collecting network and internet protocol traffic information. Typically, various network agents 120, such as routers, have flow feature enabled to generate flow records. The flow records 190 are typically exported from the network agent 120 in User Datagram Protocol (UDP) or Stream Control Transmission Protocol (SCTP) packets and collected using a flow collector. For more information, please refer to Internet Engineering Task Force (IETF) standard for Internet Protocol Flow Information eXport (IPFIX).

As described above, flow records 190 are usually sent by the network agents 120 via a UDP or SCTP, and for efficiency reasons, the network agents 120 does not store flow records once they are exported. With a flow, if the flow record 190 is dropped due to network congestion, between the network agent 120 and the data collection server 130, it may be lost forever because there is no way for the network agent 120 to resend the flow record 190. Flow may also be enabled on a per-interface basis to avoid unnecessarily burdening of the router's processor. Thus, the flows records 190 are generally based on the packets input to interfaces where it is enabled to avoid double counting and to save work for the network agent 120. Also, the network agent 120 may export a flow records for dropped packets.

Network flows have been defined in many ways. In one implementation, a flow includes a 5-tuple: a unidirectional sequence of packets to define Source IP address, Destination IP address, Source TCP port, Destination TCP port, and IP protocol. Typically, the network agent 120 will output a flow record when it determines that the flow is finished. The network agent 120 does this by "flow aging," where the network agent 120 resets an aging counter when the network agent 120 sees new traffic for an existing flow. Also, TCP session termination in a TCP flow causes the network agent 120 to expire the flow. The network agent 120 can also be configured to output a flow record at a fixed interval even if the flow is still ongoing. Alternatively, an administrator could define flow properties on the network agent 120.

A flow record 190 can contain a wide variety of information about the traffic in a given flow. An exemplary flow record 200 contains the following values, as defined in FIG. 2. In particular, typical flow records 200 may include a version number 210 to identify the type of flow being used. A Sequence number 220 identifies the flow record.

Continuing with FIG. 2, input and output interface simple network management protocol (SNMP) indices 230 may be used to dynamically identify network devices through SNMP. SNMP is used by network management systems to monitor network-attached devices for conditions that warrant administrative attention, and consists of a set of standards for network management, including an Application Layer protocol, a database schema, and a set of data objects. SNMP exposes management data in the form of variables on the managed systems, which describe the system configuration. These variables can then be queried (and sometimes set) by managing applications. Modular devices may renumber their SNMP indexes whenever slotted hardware is added or removed. Index values are typically assigned at boot time and remain fixed until the next reboot.

Continuing with FIG. 2, each of the flow records 200 further typically include information on the data transmission, including a time stamps of start and finish times 240. Other information on the data transmission includes information on the number of bytes and/or packets in a flow 250. The conditionals of the data transfer may also be included in the flow record 200, such as header data 260 describing the source and destination addresses, the source and destination addresses port numbers, transmission protocol, and the type of service (ToS). For Transmission Control Protocol (TCP), the flow record 200 may further indicate the union of all TCP flags during the flow. As well known from TCP, a data transmission involves a series of communications confirm, for example, by pairs of acknowledgements flags (ACKs). An imbalance of TCP flags suggests a message failure, whereby a message was sent and never received.

As suggested above, acquiring and storing the flow data can be computationally expensive for the router and burden the router's processor to the point where it runs out of capacity. To reduce problems caused by processor exhaustion in the network agent 120, the above-described sampling techniques, may be used in another embodiment of the present invention. When sampled flows are used, the flow records 190 can be adjusted for the effect of sampling, and various values such as traffic volumes are estimations rather than an actual measured flow volume.

The lack of reliability in the UDP transport mechanism does not significantly affect the accuracy of the measurements obtained from a sampled flow. For example, if flow samples are lost, then new values will be sent when the next polling interval has passed. In this way, the loss of packet flow samples is a slight reduction in the effective sampling rate. When sampling is used, the UDP payload contains the sampled flow datagram. Thus, instead of including an entire flow record 190 each datagram instead provides information such as the flow version, its originating agent's IP address, a sequence number, how many samples it contains and the flow samples.

Continuing with FIG. 1, the data collection system server 130 receives the streaming flow records 190 from flow record generating device 120 via a communication link 170. In one embodiment, the flow record generating device 120 may be included within network 110. In another embodiment, the flow record generating device 120 may be implemented at a location physically apart from, though functionally coupled to, network 110. Though shown in FIG. 1 as separate from the data collection system server 130, flow record generating device 120 may be a part of data analysis system server 130, in another embodiment.

A data analysis system server 150 accesses and uses the flow records 190 to perform predetermined network usage statistical analysis. In general, the data analysis system server 150 implements various statistical model that are defined to solve one or more network usage related problems, such as network congestion, network security abuse, fraud and theft, among others. The data analysis system server 150 uses the flow records 190 and the statistical models to generate a statistical result, which also may be subsequently stored within a data storage system 140. Exemplary embodiments for storing the statistical result will be described in more detail below. By analyzing flow data, the data analysis system server 150 can build a picture of traffic flow and traffic volume in a network.

In one aspect, the data analysis system server 150 may be responsive to a user interface 160 for interactive analysis of the flow records 190. User interface 160 may comprise substantially any input/output device known in the art, such as a keyboard, a mouse, a touch pad, a display screen, etc. In one example, a graphical display of the statistical results may be output to a display screen at user interface 160.

In one embodiment, data analysis system server 150 comprises a computer software program, which is executable on one or more computers or servers for analyzing the network usage data in accordance with various embodiments of the invention. Although the data storage system 140 is shown as external to the data collection system server 130 and/or the data analysis system server 150, the data storage system 140 could be alternatively arranged within either of the servers 130 and 150. Data storage system 140 may comprise substantially any volatile memory (e.g., RAM) and/or non-volatile memory (e.g., a hard disk drive or other persistent storage device) known in the art.

As previously suggested, while the each of the flow records 190 is typically compact, even small sized networks 100 may have a large number of data transactions, thereby creating a large number of the flow records 190 since there are constant data exchanges within the network 100. As a consequence, network usage analysis system 100 may produce and store numerous flow records 190 in the data storage system 140 during a given time period.

Continuing with FIG. 1, in response to these and other needs, embodiments of the present invention aggregate the flow records 190 stored in the data storage system 140 depending on the characteristics of the flow records 190. As described in greater detail below, the aggregation in the data storage system 140 addresses many problems related to the large volume of the flow records 190 and the need to access the existing records 190 while writing new flow records 190. In the in one embodiment of the present invention, the flow records 190 may also be stored redundantly and entirely in an archival data storage system 199 in which no data aggregation occurs. For example, the flow records 190 may be acquired as needed, even after aggregation in the data storage system 140. The flow records 190 may be forwarded to the archival data storage system 199 concurrently with the delivery of the flow records 190 to the data storage system 140. Alternatively, the data storage system 140 may write the flow records 190 to the archival data storage system 199 as part of the aggregation process. Because the archival data storage system 199 is rarely accessed, the flow records 190 stored within it may be significantly compressed using known techniques while substantially preserving all of the data contained within the flow records 190.

Referring now to FIG. 3 (Prior Art), an exemplary table 300 for storing multiple flow records 200 in a storage device 140 is presented. In particular, depicted table 300 includes a column 310 that assigns a flow record identifier for each of the n received flow records 200. The Table 300 also includes a column 320 that contains an IP source address for each of the received flow records 200, a column 330 that contains a time stamp for each of the received flow records 200, and, a column 340 that contains a byte size of the flows associated with the received flow records 200. In the example, the n flow records describe n flows that originated from k different network devices.

In embodiments of the present invention, each of the flow records 200 may be categorized according to the associated time stamp 240. In particular, two or more time buckets may be defined, with each of the flow records 200 being uniquely assigned to only one of the time buckets based upon the timestamps 240 associated with the flow records 200. Typically, a start and end times for each of the time buckets are defined, and the timestamps 240 associated with a flow record 200 is used to identify an appropriate time bucket for the flow record 200.

Referring now to FIG. 4, the exemplary flow data table 300 is modified in flow table 400 to include an extra column 450 with a cluster identifier. In particular, the depicted table 400 includes a column 410 that assigns a flow record identifier for each of the n received flow records 200. The Table 400 also includes a column 420 that contains an IP source address for each of the received flow records 200, a column 430 that contains a time stamp for each of the received flow records 200, and a column 440 that contains a byte size for each of the received flow records 200.

In modified flow table 400, x different time buckets have been defined, each having a beginning and ending start time. Typically, the time buckets have a fixed duration. It should be appreciated, however, the time buckets may optionally have durations that vary as needed for the optimal performance of the network monitoring system 100. For example, the time buckets associated with periods of light network use may have longer durations than the time buckets associated with periods of heavy network use, thereby allowing the x time buckets to have approximately equal number of associated flow records.

In the modified flow table 400 of FIG. 4, a column 450 indicates a cluster identifier assigned to each of the flow records. In the depicted example, records 1 and 2 both occurred with a time period 1 that includes events that occurred between time 0 and time T1. Thus, both record 1 and record 2 have a cluster number 1 in column 450. Likewise, each of the remaining records is associated with a time period and assigned a corresponding cluster number.

Figure 5:
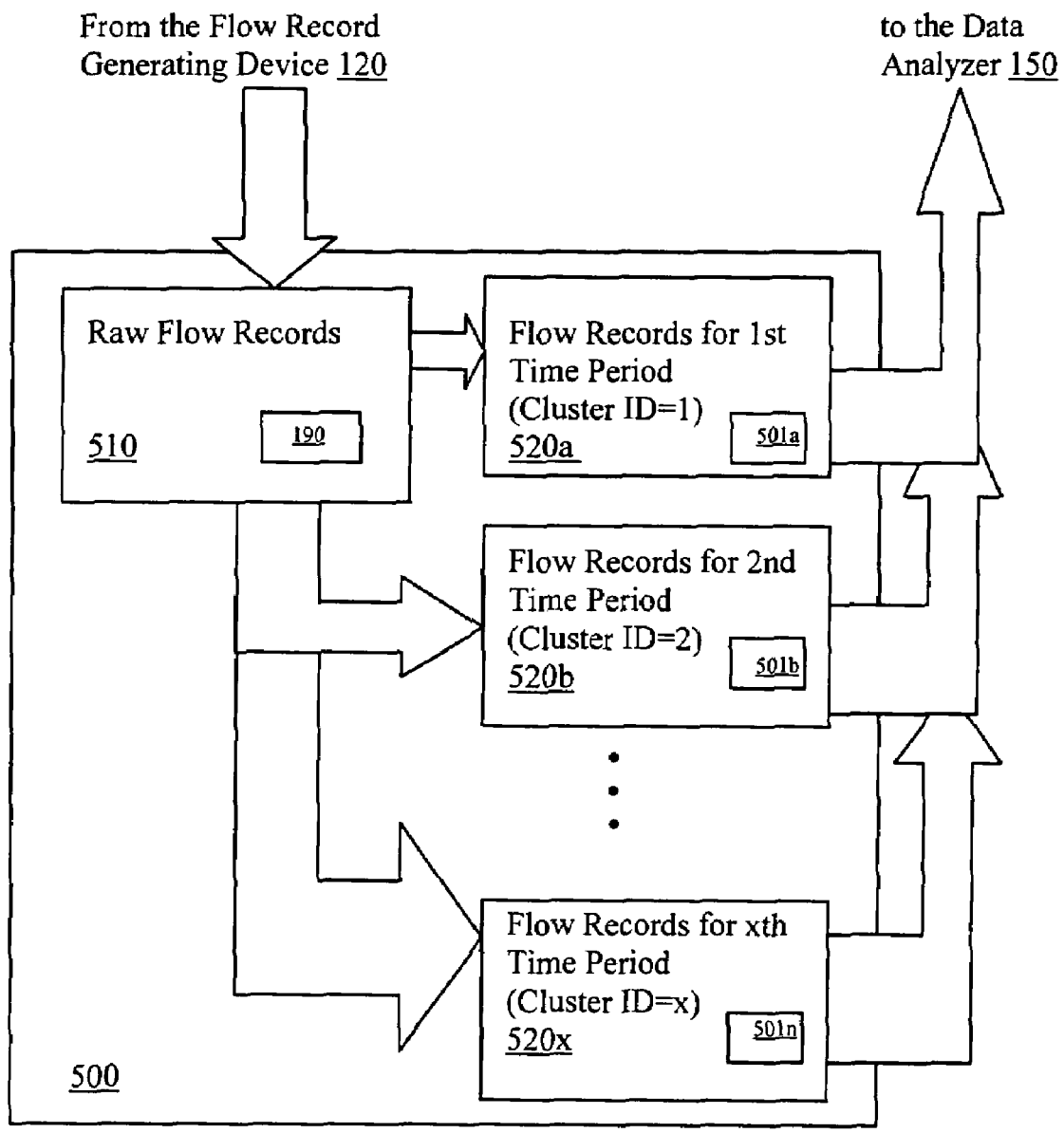

The cluster identifiers in column 450 may be used to divide and organize the flow records, as described in FIG. 5. In FIG. 5, the data storage system 140 for organizing the numerous stored flow records 190 in accordance with an embodiment of the present invention is now presented. In particular, the data storage system 140 typically includes a standard query language (SQL) database 500 on a storage area network (SAN). The database 500 includes multiple tables 510 and 520a-520x that divide the database 500.

In the depicted embodiment, each of the tables 520a-520x is associated with x different time buckets. When first received, the new flow records 190 are stored in current table 510 that corresponds, for example, to table 300 in FIG. 3. As described above, the time stamp associated with each of the new flow records 190 is used to assign a cluster number to flow records 190. Using the cluster number, the new flow records 190 are organized as desired as the flow data 501a for time period a. Likewise, each of the other aggregated tables 520b-520x contains, respectively, aggregated flow data 501b-501x for time periods b-n.

Continuing with FIG. 5, it can be seen that the Flow Record Generating Device 120 may forward new flow records 190 in the current table 510. At the same time, the Data Analyzer 150 may access the organized data 501a-501x in each of the tables 520a-520x. In this way, data contention is minimized. The organization further eases processing and manipulating of the flow record data since the stored sets of data 501a-501x are significantly smaller than storing the flow records in a single table 300.

As described above, each of the tables 520a-520x is associated with a time period. The time period may be unique and fixed, or as described below, the time periods may vary as needed. It should be appreciated that the duration of the time periods may be defined as needed to accomplish the goals of the data analysis system 100. For example, flow data may be grouped into period of few minutes, hour, or days.

The data 501a-501x in the tables 520a-520x may be formed as needed, according to known techniques. For example, one record in the aggregated data 501a for time period 1 may include an aggregated flow describing all communications of a particular type between two nodes during that time period 1. In this way, a separate record may by used for communications between different nodes, or different types of communications (different protocols, QoS, etc.) between the same two nodes.

Figures 6, 7:
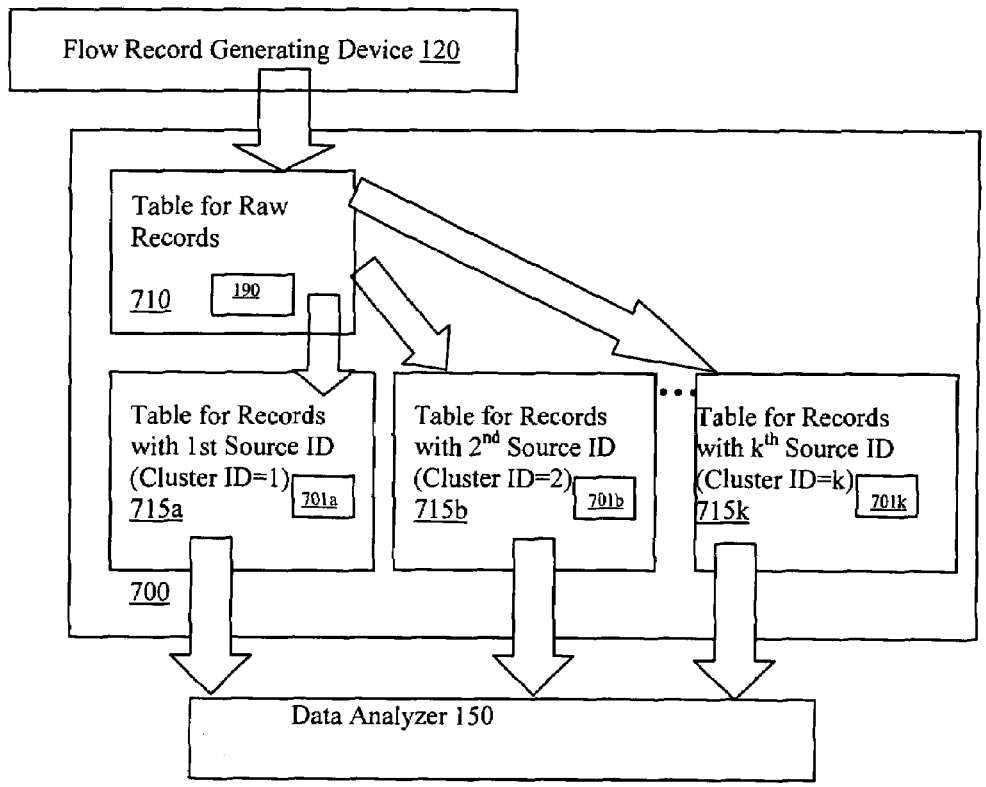

Referring now to FIG. 6, the exemplary flow data table 300 is modified in flow table 600 to include an extra column 650 with cluster identifiers. In particular, the depicted table 600 includes a column 610 that assigns a flow record identifier for each of the n received flow records 200. The table 600 also includes a column 620 that contains an IP source address for each of the received flow records 200, a column 630 that contains a time stamp for each of the received flow records 200, and a column 640 that specifies a byte size of the flows associated with the received flow records 200.

In modified flow table 600, k different source buckets have been defined, one for each of the different source ID identified in the received flow records 200. In this way, a separate bucket is created for all flows initiated at each of the network nodes. Alternatively, the source ID bucket could be modified to leverage the IP address protocols to group different modes sharing similar characteristics.

In the modified flow table 400 of FIG. 6, a column 650 indicates a cluster identifier assigned to each of the flow records. In the depicted example, records 1 and 3 both initiated at the same node, as indicated by the shared source IP address in column 620. Thus, both record 1 and record 3 have a cluster number 1 in column 650. Likewise, each of the remaining records is associated with source IP address and assigned a corresponding cluster number.

An exemplary use of the Source ID categorization is now described with reference to FIG. 7, the data storage system 140 for aggregating the numerous stored flow records 190 in accordance with an embodiment of the present invention is now presented. In particular, the data storage system 140 is typically a standard query language (SQL) database 700 on a storage area network (SAN). The database 300 includes multiple tables 710 and 715a-715n that divide the database 700.

In the depicted embodiment, table 710 represents raw flow records 190, as described above in FIG. 2. Tables 715a-715n are each associated with a different network device a through k. As flow records 190 are received in the database 700, the flow records 190 are stored in the table 710. The stored flow records 190 in table 710 associated with a particular device a (or device category a) are identified and tagged with bucket/cluster number and moved to table 715a. Likewise, the stored flow records 190 in table 710 associated with other device b-k (or device categories b-k) are identified and moved to tables 715b-715k associated with the particular devices b-k.

For example, in one embodiment, data flows records 190 from the current time period are initially stored in current table 710. When the flow records 190 are associated with a source device and a bucket/cluster number is assigned to the flow record and moved to a corresponding data type 715a-715k containing sorted flow data 701a-701k for device a-k. Then, current table 710 may be reset. If a table 715a does not exist for device a, a new current table 715a may be created using Data Definition Language (DDL) functions to store new flow records 190. Likewise, each of the other sorted tables 715b-715k contains, respectively, sorted flow data 701b-701k for devices b-k.

In the sorted tables 715a-715k, the sorted flow data 701a-701k may be aggregated as desired. The aggregation generally occurs along one or more of the above-described data categories within the flow record. For example, the aggregated may describe all data of a type or protocol transmitted to or from a particular router a during a time period, as described in greater detail below in FIG. 10.

Continuing with FIG. 7, it can be seen that the Flow Record Generating Device 120 may forward new flow records 190 in the current table 710. At the same time, the Data Analyzer 150 may access the sorted data 701a-701k in each of the sorted tables 715a-715k. In this way, data contention is minimized. Furthermore, because each of the aggregated data 701a-701k is significantly smaller than the complete set of flow records 190, the analysis is greatly eased.

While the above two examples depict creation of a sub-tables according to either a cluster identifier 650 derived from the source IP address 620 in the flows records 190 or a cluster identifier 450 derived by using the timestamp 430 in the flows records to define time buckets, it should be appreciated that any flow record data category, such as those described flow record 200 in FIG. 2, may be used. In addition, the data clusters defined within a modified flow records data table, in accordance with embodiments of the present invention, may be defined according to combinations of flow record data categories.

For example, referring to FIG. 8, cluster may defined by both the time bucket and source IP address associated with each of the flow records 200. The modified flow record table 800 includes an extra column 850 with a cluster identifier defined by both the time bucket and source IP address associated with each of the flow records 200. In particular, the depicted table 800 includes a column 810 that assigns a flow record identifier for each of the n received flow records 200. The Table 800 also includes a column 820 that contains an IP source address for each of the received flow records 200, a column 830 that contains a time stamp for each of the received flow records 200, and a column 840 that contains a byte size for each of the received flow records 200. The cluster number may be defined according to both the source IP address 820 and the time stamp 830. In the example, with n flow records having k different source addresses and x different time buckets, k*x clusters may be defined to represent each possible combination of source addresses and time buckets. It should be apparent that any combination of know flow record categories may be used. For example, the flow records 200 may be organized by a combination of the source and destination address. In this way, the data can reflect data transfers through a node, whether that node sent or received the transferred data.

As noted above, once the data is partitioned and organized in accordance with embodiments of the present invention, the organized data may be processed as needed to produce meaningful result. As depicted in FIG. 7, the structured database 700 contains separate data tables 715a-715k to store the flow records associated with each of the source devices.

Figure 9:
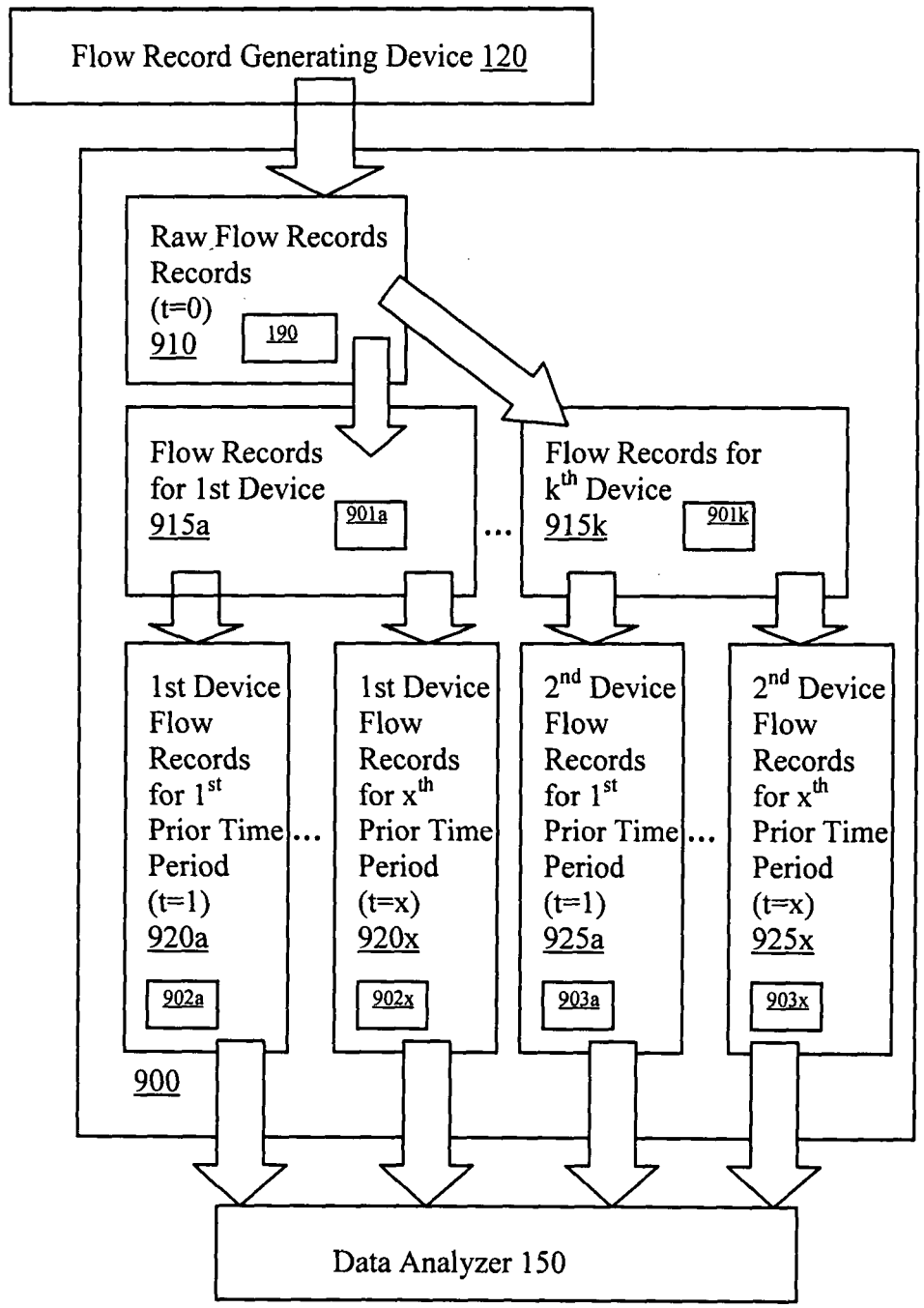

Referring now to FIG. 9, the sorted data 901a-901n in the organized tables 915a-915k is analogous to sorted data tables 715a-715k in table 700 in FIG. 7. Thus, the data 901a in table 915a includes flow records describing all communications from that node a, and the remaining tables 915b-k include flow records 901b-901k describing all communications, respectively, from the nodes b-k. Continuing with FIG. 9, the database 900 further includes aggregated tables 920a-920x, and 925a-925x. Similar to FIG. 7, in the depicted embodiment of FIG. 9, a table 910 represents raw flow records 190, as described above in FIG. 2. Tables 915a-915k are each associated with different network devices a-k. In particular, as described above, as flow records 190 are received in the database 900, the flow records 190 are stored in the table 910, and the stored flow records 190 in table 910 associated with a particular device a (or device category a) are identified, aggregated, and moved to table 915a. Likewise, the stored flow records 190 in table 910 associated with other devices b-k (or device categories b-k) are identified, aggregated, and moved to the appropriated sorted tables 915b-915k that are each associated with the particular devices b-k.

Continuing with FIG. 9, after the data is organized at the device level in tables 915a-915k, the data is aggregated according to the time period associated with the flow records, where tables 920a-920x are flow records associated with device a in time periods a through x and tables 925a-925x are formed from table 915k using the flow records associated with device k in time periods a through –x. Thus, in the depicted embodiment, each of the tables 920a-920x or 925a-925x is associated with a different time period. Each of the other aggregated tables 920a-920x, 925a-925x contains, respectively, aggregated flow data 902a-902x for device a in previous time periods a-k and aggregated flow data 903a-903x for device k in previous time periods a-x. In this way, the aggregation generally occurs along one or more of the above-described data categories within the flow record.

Continuing with FIG. 9, it can be seen that the Flow Record Generating Device 120 may forward new flow records 190 in the current table 910. At the same time, the Data Analyzer 150 may access the aggregated data 902a-902x and 903a-903x in each of the aggregated tables 920a-920x and 925a-925x. In this way, data contention is minimized. Furthermore, because the aggregated data 902a-902x, and 903a-903x is significantly smaller than the flow records 190, significant storage capacity is freed. Also, the analysis is greatly eased since the aggregated data 902a-902x, and 903a-903x is significantly smaller.

As described above, each of the tables 920a-920x, 925a-925x is associated with a time period a-x. The time periods may be unique and fixed the time periods may vary as needed. As described above, the tables 920a-920x, 925a-925x are associated with time periods a-x as defined within each of the flow records 200. In particular, as noted above in table 200 of FIG. 2, each of the flow records 190 typically has an associated time stamp. The time stamp for a flow record 190 is compared to the time periods of the aggregated tables 920a-920x, 925a-925x. In this way, the aggregation generally occurs along one or more of the above-described data categories within the flow record. For example, the aggregated may describe all data of a type or protocol transmitted to or from a particular router a during a time period.

As described above, the embodiment depicted in FIG. 9 generally describes the periodic and cyclical aggregation and storage of the current flow records for each of n network devices. It should be appreciated that the duration of the time periods may be defined as needed to accomplish the goals of the data analysis system 100. For example, data may be aggregated every few minutes, hourly, or daily.

The aggregated data 902a-902x, 903a-903x in the aggregated tables 920a-920x and 925a-925x may be formed as needed, according to known aggregation techniques. One record in the aggregated data 901a for a time period for device a may include an aggregated flow describing all communications of a particular type to that node during that time period. In this way, a separate record may by used for communications between the node of interest and different nodes, or different types of communications (different protocols, QoS, etc.) between the node of interest and different nodes.

It should be appreciated that data aggregation is described herein as depending on source ID and time bucket, the aggregation may occur along one or more of the above-described data categories within the flow record 200. For example, the aggregated may describe all data of a type or protocol transmitted to or from a particular router during the prior time periods. The organized tables 915a-915k may store records from the latest time period (such as the last fifteen-minute), whereas the aggregated tables 920a-920n, and 925a-925n may store aggregated records from of a longer period, such as the rest of the day. The organized tables 915a-915 are then periodically cleared, such as once a day, perhaps after the aggregated data is acquired by the analysis server 150.

While the invention has been described with reference to an exemplary embodiments various additions, deletions, substitutions, or other modifications may be made without departing from the spirit or scope of the invention. Accordingly, the invention is not to be considered as limited by the foregoing description, but is only limited by the scope of the appended claims.

What is claimed:

1. A system for organizing network flow information, the system comprising:
    a data storage system comprising a raw data table, wherein the raw data table comprises flow records comprising data categories and a plurality of cluster identifiers; and
    a flow generating device configured to provide the flow records to the raw data table; and
    wherein one of said cluster identifiers is appended to each of said flow records, wherein each of said flow records comprises a time stamp, and
    wherein said cluster identifiers are produced according to timestamps such that each of the cluster identifiers identify different time periods;
    wherein the data storage system further comprises sub-tables configured to receive data from said raw data table, wherein each of said sub-tables is uniquely associated with one of the cluster identifiers, and
    wherein the raw data table is configured to be partitioned by moving each of the flow records into one said sub-tables associated with the cluster identifier appended to that flow record;
    a data analysis device configured to analyze a aggregated data tables,
    wherein said system is configured such that the flow generating device and the data analysis device operate concurrently.

2. The system of claim 1, wherein the data storage system further comprises aggregated data tables, wherein each of said aggregated data tables is associated with one of said sub-tables and wherein each of said aggregated data tables is configured to receive and aggregate flow record data contained in said associated sub-table.

3. The system of claim 1, wherein said time periods do not overlap.

4. The system of claim 1, wherein said time periods are of equal duration.

5. The system of claim 1, wherein each of said flow records comprises a network device identifier and where said cluster identifiers are produced according to said network device identifiers.

6. The system of claim 5, wherein the data storage system further comprises:
    a first aggregated data table containing first aggregated flow records for a first network device in a first prior time period, and
    a second aggregated data table containing second aggregated flow records for a second network device in the first prior time period.

7. The system of claim 5, wherein the data storage system further comprises:
    a first aggregated data table containing first aggregated flow records for a first network device in a first time period, and
    a second aggregated data table containing second aggregated flow records for the first network device in a second time period.

8. The system of claim 1 further comprising an archival storage system that is configured to store the raw flow record data for the first network device.

9. The system of claim 1, wherein said cluster identifiers are further produced using at least one of said data categories.

10. A method for organizing network data flows, the method comprising:
    during a first period of time, storing first flow records in a first table, said first flow records comprising data categories; and
    appending a cluster identifier to each of the first flow records, wherein the cluster identifier is produced using at least one of said data categories;
    after the first period of time and during a second period of time, creating a second table;
    storing second flow records in the second table; and
    moving each of said second flow records to sub-tables configured to receive data from said second table according to cluster identifiers, wherein each of said sub-tables is uniquely associated with one of the cluster identifiers;
    wherein said storing second flow records in the second table and aggregating said identified first flow records in said first table occur concurrently.

11. The method of claim 10 further comprising aggregating the moved second flow records in each of the subtables.

12. The method of claim 10, wherein said first period and said second period do not overlap.

13. The method of claim 10, wherein said first period and said second period are of equal duration.

14. The method of claim 10 further comprising:
    archiving said first flow records and said second flow records; and
    compressing said archived first and second flow records.

15. A system for organizing network flow information, the system comprising:
- a flow generating device configured to access a storage system to provide flow records;
- a storage system configured to receive and store flow records and to append a cluster identifier to each of the flow records; and
- a data analysis device configured to access the storage system,
- wherein said flow generating device and said data analysis device are configured to access said storage system concurrently,
- wherein each of said flow records comprises a time stamp and wherein said cluster identifier is produced according to said timestamps such that each cluster identifier identifies a different time period;
- wherein the storage system further comprises aggregated data tables, wherein each of said aggregated data tables is associated with one of sub-tables and wherein each of said aggregated data tables is configured to receive and aggregate flow record data contained in said associated sub-table.

16. The system of claim 15 wherein the storage system comprises sub-tables, wherein each of said sub-tables is uniquely associated with one of the cluster identifiers.

17. The system of claim 15, wherein each of said flow records comprises a network device identifier and where said cluster identifiers are produced according to said network device identifiers.

18. The system of claim 15 further comprising an archival storage system that is configured to store the raw flow record data.

* * * * *